US008554275B2

(12) United States Patent
Chung

(10) Patent No.: US 8,554,275 B2
(45) Date of Patent: Oct. 8, 2013

(54) MOBILE TERMINAL HAVING AN IMAGE PROJECTOR AND CONTROLLING METHOD THEREIN

(75) Inventor: Deok Yong Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 12/954,379

(22) Filed: Nov. 24, 2010

(65) Prior Publication Data

US 2011/0134300 A1 Jun. 9, 2011

(30) Foreign Application Priority Data

Dec. 4, 2009 (KR) .................. 10-2009-0120157

(51) Int. Cl.
*G06F 3/041* (2006.01)
(52) U.S. Cl.
USPC .......................................... 455/557; 345/173
(58) Field of Classification Search
USPC ............ 455/550.1, 557, 575.1; 345/121, 156, 345/173
See application file for complete search history.

(56) References Cited

U.S. PATENT DOCUMENTS

2007/0265717 A1  11/2007  Chang
2010/0085316 A1*  4/2010  Kim .............................. 345/173

FOREIGN PATENT DOCUMENTS

WO    WO 2008/011361 A2    1/2008

* cited by examiner

*Primary Examiner* — Sam Bhattacharya
(74) *Attorney, Agent, or Firm* — Birch, Stewart, Kolasch & Birch, LLP

(57) ABSTRACT

A mobile terminal having an image projector and controlling method therein are disclosed, by which a detachable image projector can be provided to the mobile terminal and by which a projection mode of a detachable image projector can be conveniently changed. The present invention includes a housing, a touchscreen provided to one surface of the housing to recognize a touch input of a user, a detachable projector module having an activation switch provided to one lateral side, the detachable projector module configured to project a prescribed image on an external surface, and a controller controlling an activation message for receiving a confirmation of a presence or non-presence of activation of the projector module from the user to be displayed on the touchscreen if the activation switch is manipulated. In this case, the detachable projector module is attached to a prescribed surface of the housing except the one surface of the housing to which the touchscreen is provided.

16 Claims, 16 Drawing Sheets

MOBILE TERMINAL HAVING AN IMAGE PROJECTOR AND CONTROLLING METHOD THEREIN

Pursuant to 35 U.S.C. §119(a), this application claims the benefit of earlier filing date and right of priority to Korean Application No. 10-2009-0120157, filed on Dec. 4, 2009, the contents of which is hereby incorporated by reference herein in their entirety.

BACKGROUND OF THE INVENTION

1. Field of the Invention

The present invention relates to a mobile terminal, and more particularly, a mobile terminal having a detachable image projector and controlling method therein. Although the present invention is suitable for a wide scope of applications, it is particularly suitable for a mobile terminal having a detachable image projector.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or video files, game play, broadcast reception and the like for example.

To support and increase of the terminal functions, it may be able to consider the improvement of structural part and/or software part of the terminal.

Recently, as an image projector is downsized, an image projector of a stationary or detachable type is provided to a mobile terminal. Therefore, the demand for diverse and convenient functionality via the image projector is rising.

SUMMARY OF THE INVENTION

Accordingly, the present invention is directed to a mobile terminal having an image projector and controlling method therein that substantially obviate one or more problems due to limitations and disadvantages of the related art.

An object of the present invention is to provide a mobile terminal having an image projector and controlling method therein, by which a detachable image projector can be provided to the mobile terminal.

Another object of the present invention is to provide a mobile terminal having an image projector and controlling method therein, by which a projection mode of a detachable image projector can be conveniently changed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a housing, a touchscreen provided to one surface of the housing to recognize a touch input of a user, a detachable projector module having an activation switch provided to one lateral side, the detachable projector module configured to project a prescribed image on an external surface, and a controller controlling an activation message for receiving an confirmation of a presence or non-presence of activation of the projector module from the user to be displayed on the touchscreen if the activation switch is manipulated. In this case, the detachable projector module is attached to a prescribed surface of the housing except the one surface of the housing to which the touchscreen is provided.

Accordingly, the present invention provides the following effects and/or advantages.

First of all, a mobile terminal according to at least one embodiment of the present invention is facilitated to project an image on an external plane via a detachable image projector module.

Secondly, a user is facilitated to change a projection mode of a detachable image projector provided to a mobile terminal of the present invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
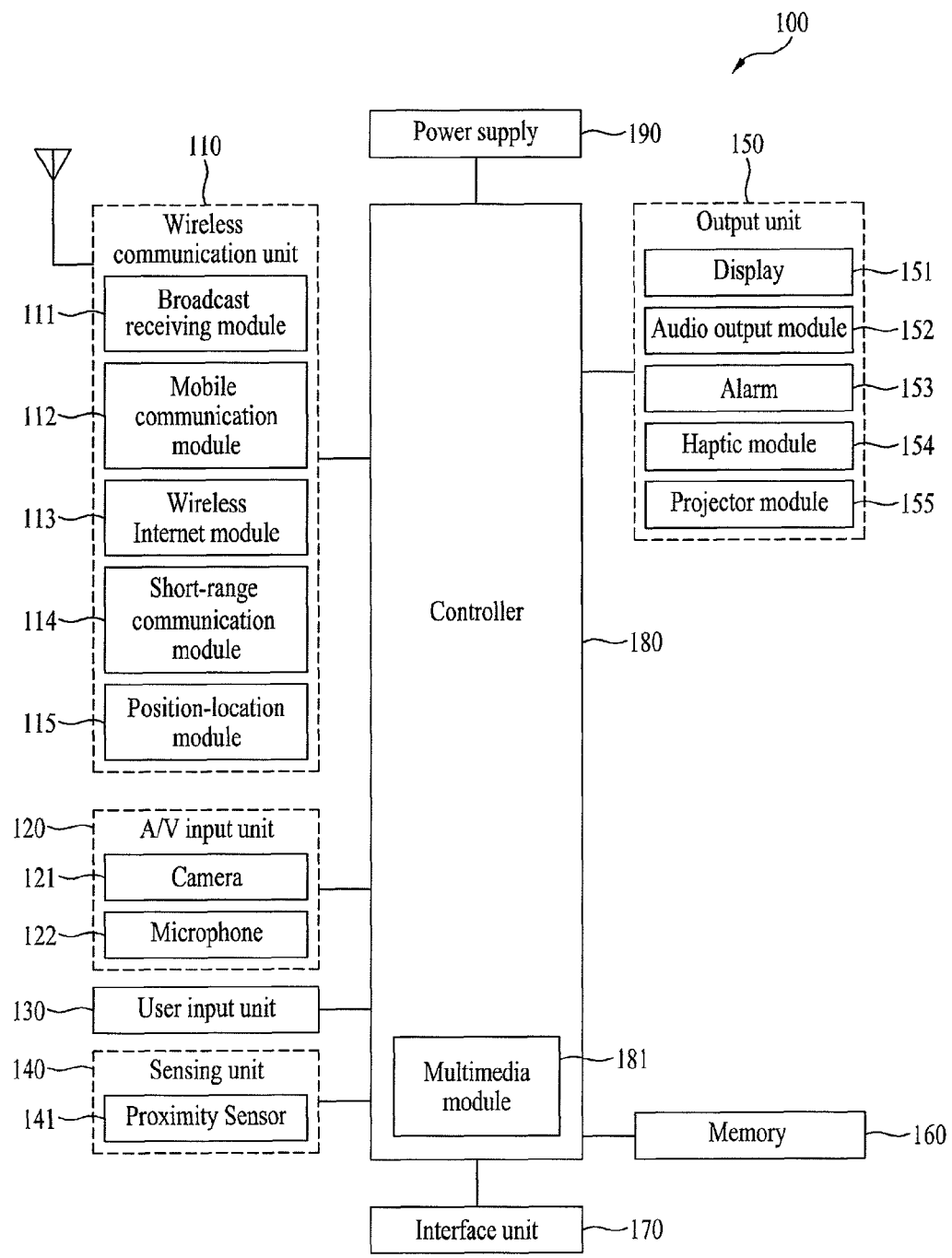
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
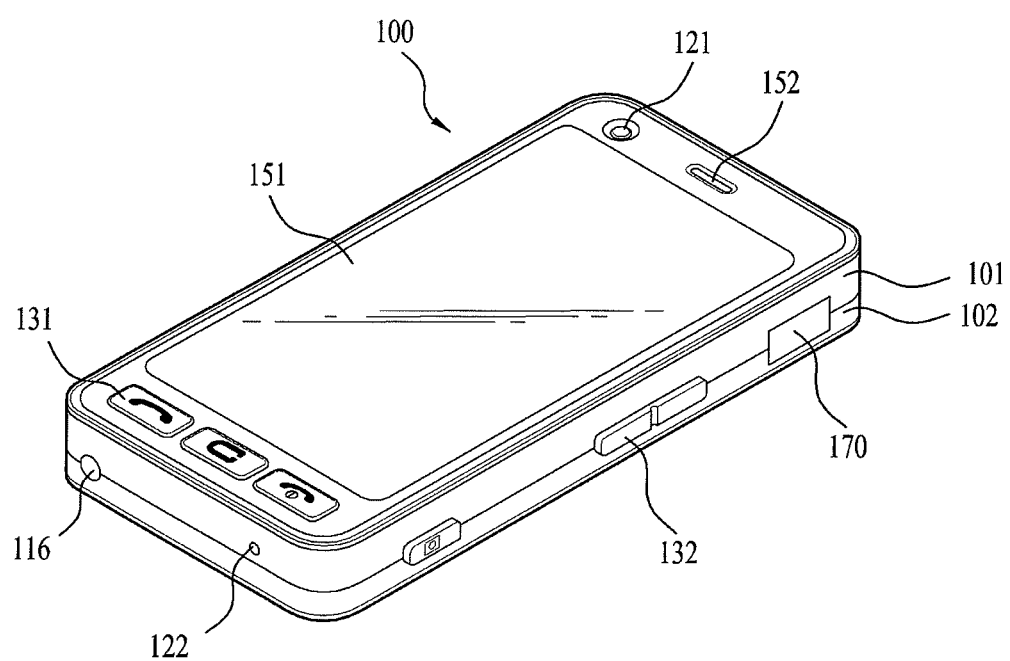
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
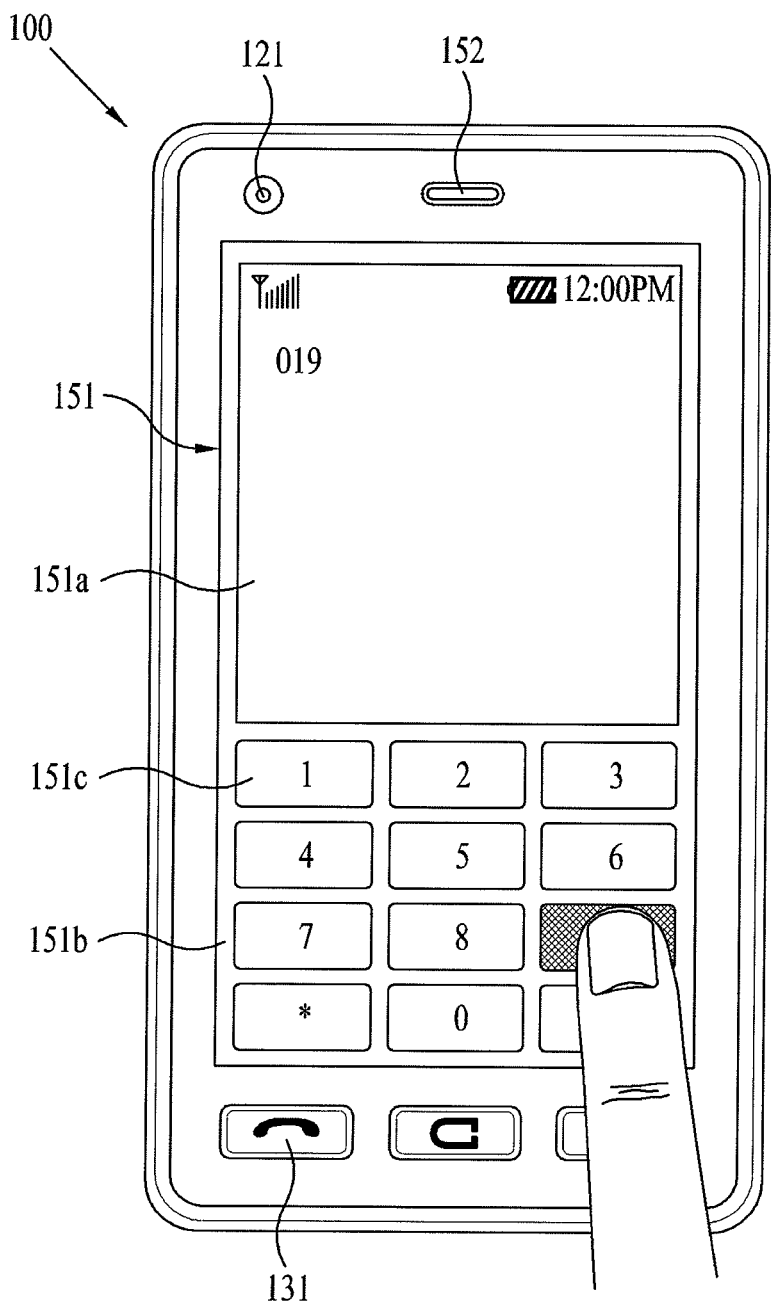
FIG. 3 is a front diagram of a mobile terminal according to one embodiment of the present invention to explain one operational state of the mobile terminal.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151*a* and an input window 151*b* are displayed on the display 151. A soft key 151*c*' representing a digit for inputting a phone number or the like is outputted to the input window 151*b*. If the soft key 151*c*' is touched, a digit corresponding to the touched soft key is outputted to the output window 151*a*. If the first manipulating unit 131 is manipulated, a call connection for the phone number displayed on the output window 151*a* is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

Meanwhile, in the manipulation of a touchscreen, 'pointer' or 'cursor' is frequently used as an arrow mark indicating a specific position by being displayed on a display unit. In this disclosure, in order to discriminate 'pointer' and 'cursor' from each other, a figure or the like, which is displayed on a display unit to indicate a specific position, is named 'cursor'. And, a user's finger, a stylus pen or the like, which is used to physically apply a contact touch or a proximity touch to a specific point of a touchscreen, is named 'pointer'.

The proximity sensor 141 described with reference to FIG. 1 is explained in detail with reference to FIG. 4 as follows.

Figure 4:
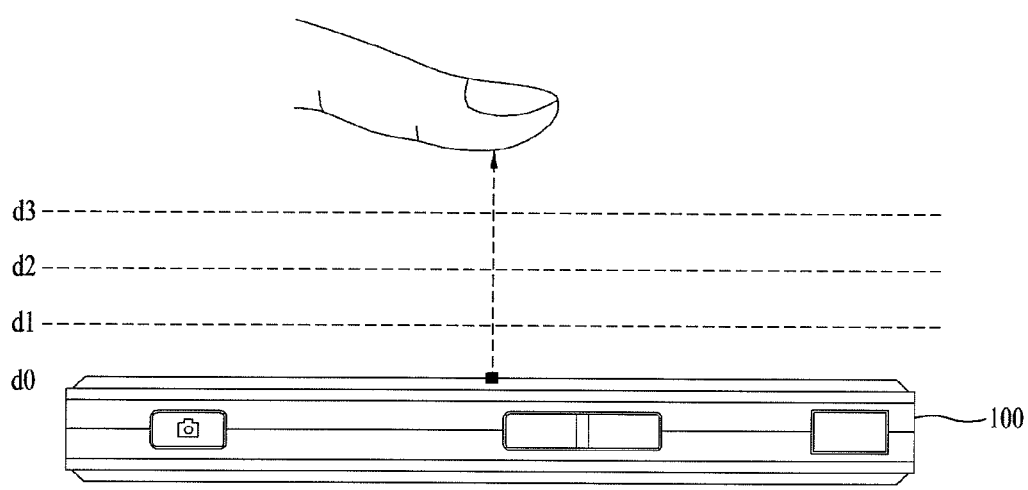
FIG. 4 is a diagram for concept of proximity depth of a proximity sensor.

FIG. 4 is a conceptional diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth').

In FIG. 4, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Structures and Configurations of Detachable Projector Module

In the following description, a structure of a detachable image projector module applicable to embodiments of the present invention is explained.

First of all, various projection systems are applicable to a detachable image projector module according to the present invention. For instance, there is a digital light processing (hereinafter abbreviated DLP) system. In the DLP system, an image is generated using micromirrors attached to a DMD (digital micromirror device) chip placed between a light source and a lens. The DLP system supports a clean image based on the digital processing meant by the term 'digital light processing' as it is.

Moreover, a detachable image projector module according to the present invention can be attached to one face of a mobile terminal, to which the display unit 151 is not provided, and more particularly, to a backside of the mobile terminal for example. If necessary, a power supply device (e.g., a battery, an external power supply connector, etc.) for driving a projector module can be provided within the detachable image projector module.

Figure 5A:
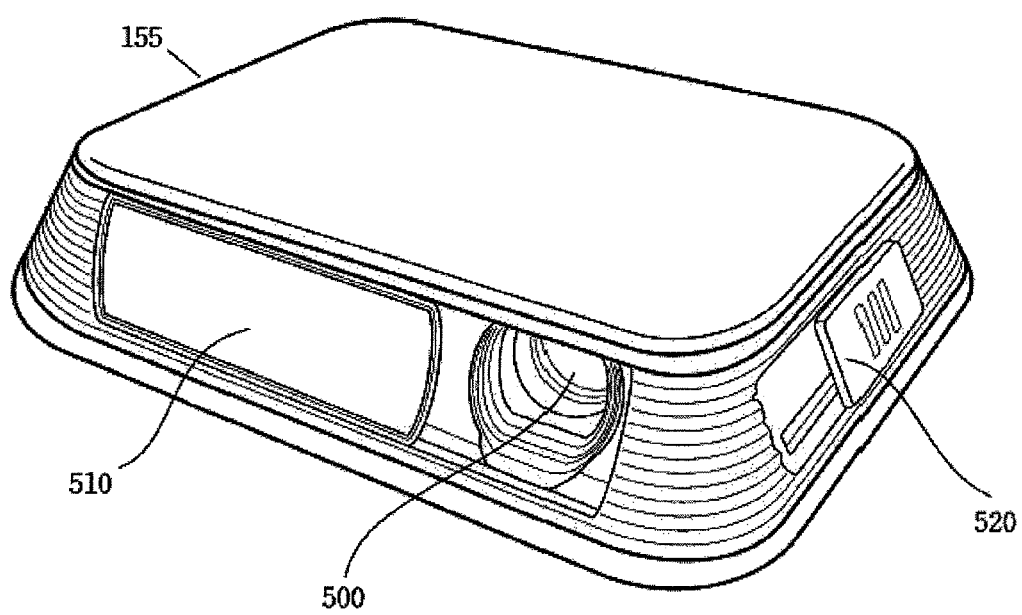
FIG. 5A and FIG. 5B are perspective diagrams of a detachable image projector module applicable to embodiments of the present invention, in which the detachable image projector module is seen in different viewing angles.
Figure 5B:
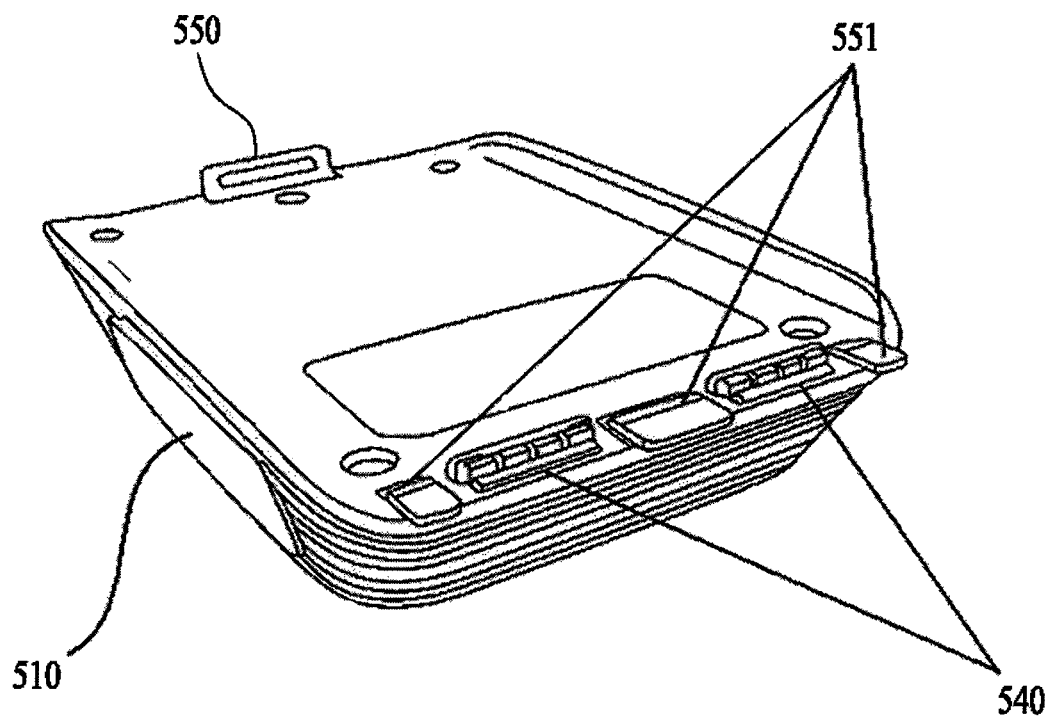

FIG. 5A and FIG. 5B are perspective diagrams of a detachable image projector module applicable to embodiments of the present invention, in which the detachable image projector module is seen in different viewing angles.

Referring to FIG. 5A, a detachable projector module 155 has a rectangular parallelepiped shape. A lens 500 is provided to a front side of the detachable projector module 155. And, a slide type cover 510, which is slidably drivable, is provided to the front side to protect the lens 500. In view of one side, a shape of the detachable projector module 155 is a trapezoid in the following drawings including FIG. 5A for example, by which an exterior of the detachable projector module according to the present invention is non-limited.

The slide type cover 510 is able to play a role as a switch according to its location. In particular, if the lens 500 is covered with the slide type cover 510, a function of the projector module 155 is interrupted or a power of the projector module 155 is turned off. On the contrary, if the slide type cover 510 becomes open to expose the lens 500, the power of the projector module is turned on or the controller 180 of the mobile terminal 100 can be informed that the slide type cover 510 is open for the future operation instruction.

Moreover, a focus adjusting slide bar 520 can be additionally provided to one lateral side of the projector module 155 to manually adjust a focus of the lens 500. If the projector module has an automatic focusing system, the focus adjusting slide bar can be omitted.

FIG. 5B shows a backside of the projector module 155 shown in FIG. 5A.

Referring to FIG. 5B, a first latch 550 and a second latch 551 differing from the first latch 550 in type are provided to both lateral ends of the backside, respectively. Both of the first and second latches 550 and 551 are locked and fixed to a body of the mobile terminal 100. A connector pin 540 is provided adjacent to the second latch 551. In this case, the connector pin 540 is connected to a contact point provided to body of the mobile terminal to supply a control signal, video data to project and power to the projector module 155.

An exterior configuration of the above described projector is just exemplary. In particular, shapes, exteriors and contact arrangements of the latches can be diversely modified.

FIGS. 6A to 6D are diagrams for describing a process for combining detachable image projector module applicable to embodiments of the present invention with a mobile terminal body.

Figure 6A:
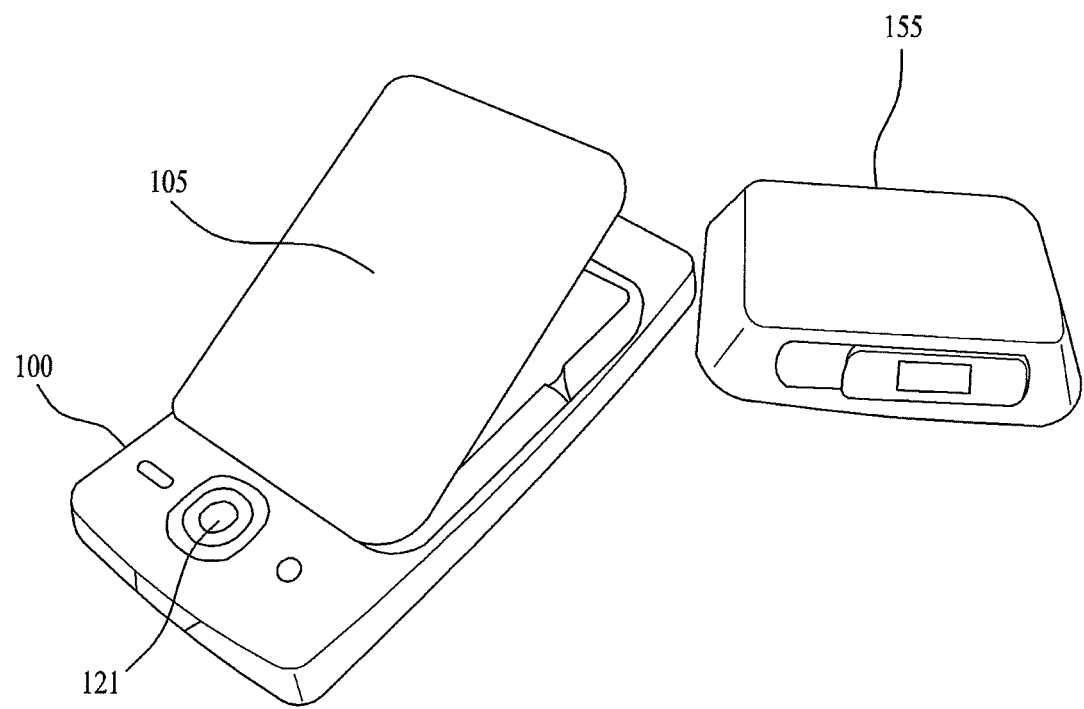
FIGS. 6A to 6D are diagrams for describing a process for combining a detachable image projector module applicable to embodiments of the present invention with a mobile terminal body.

Referring to FIG. 6A, a camera 121 can be provided to one face of the mobile terminal 100, and more particularly, to a backside of the mobile terminal 100. A detachable battery cover 105 can be provided to a central part of the backside. In this case, the detachable battery cover 105 configures a portion of an external housing of the mobile terminal 100. In order to load the projector module 155, a user removes the battery cover 105 from the body of the mobile terminal 100 in the first place.

Figure 6B:
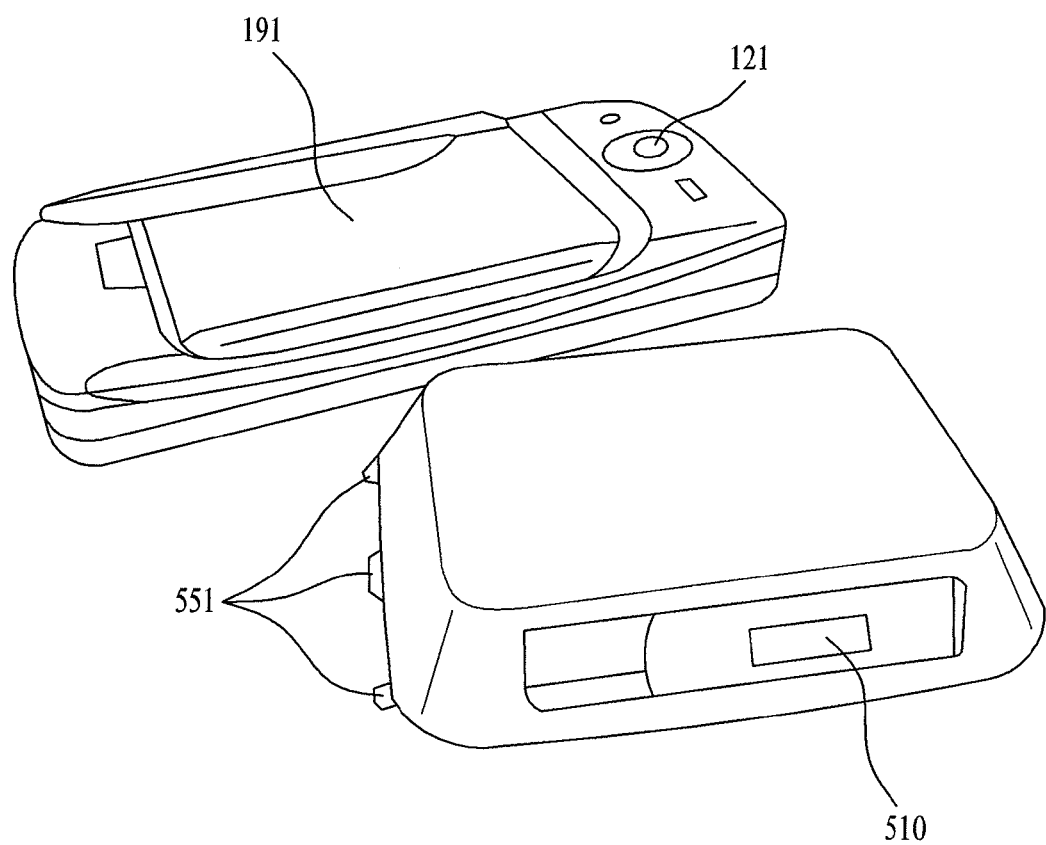

Referring to FIG. 6B, as the battery cover 105 is separated from the body of the mobile terminal 100, a battery 191 loaded in the mobile terminal 100 is exposed. In this case, body latches (not shown in the drawing) for fixing the former latches 550 and 551 described with reference to FIG. 5 and a contact point (not shown in the drawing) to be connected to the connector pin 540 shown in FIG. 5 are exposed together.

Figure 6C:
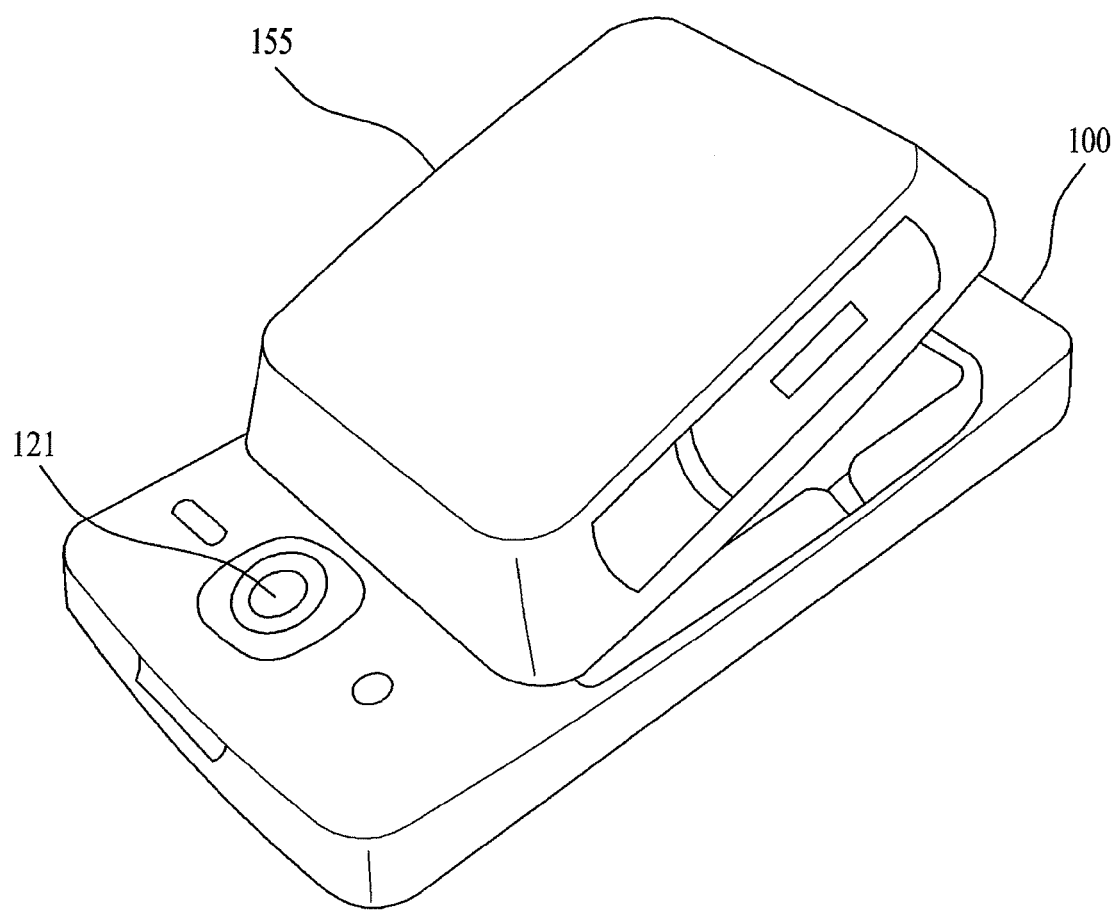

A user positions the projector module 155 toward a direction for connecting the connector pint 540 and the contact point of the body of the mobile terminal 100 together and then combines the projector module 155 with the body of the mobile terminal 100 using the latches in the order shown in FIG. 6C.

Figure 6D:
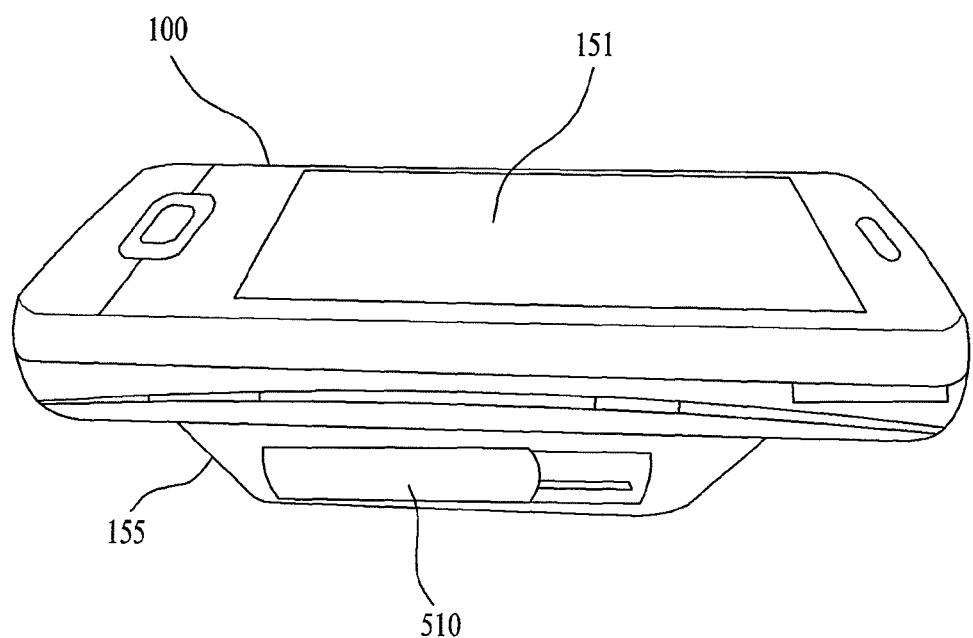

Once the combination is completed through the above described steps, the body of the mobile terminal 100 and the projector module 155 can be combined into the configuration or shape shown in FIG. 6D.

In the following description, explained are functions that can be implemented in a situation that the body of the mobile terminal 100 and the projector module 155 are combined together.

Activation of Projector Module

After completion of the above combining process described with reference to FIGS. 6A to 6D, methods for a user to activate the projector module are explained as follows.

Figure 7A:
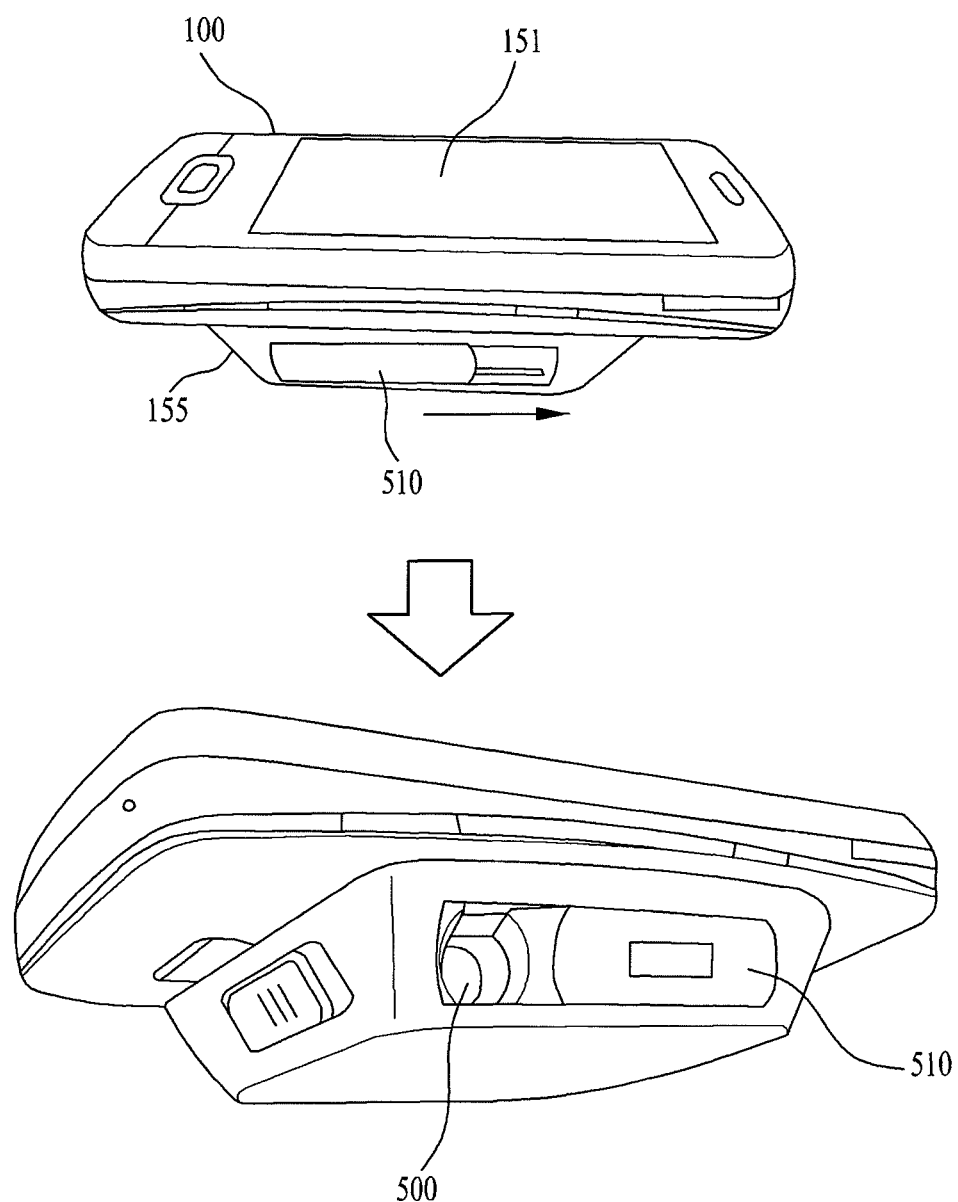
FIG. 7A and FIG. 7B are diagrams for describing a process for activating a projector module according to one embodiment of the present invention.
Figure 7B:
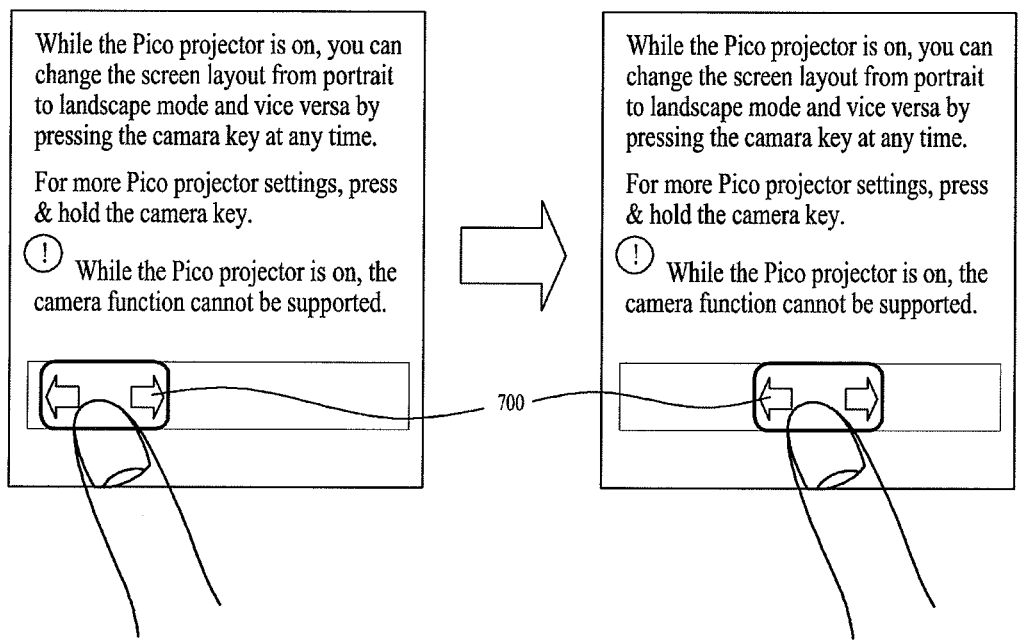

FIG. 7A and FIG. 7B are diagrams for describing a process for activating a projector module according to one embodiment of the present invention.

Referring to FIG. 7A, while the projector module 155 is combined with the mobile terminal 100, a user moves the slider type cover in a closed state toward an opposite direction to expose the lens 500 in order to activate the projector module 155.

If the slide type cover 510 is opened, a virtual slide bar 700, as shown in FIG. 7B, is displayed on a whole screen of the touchscreen 151 of the mobile terminal 100 or can be popped up on the touchscreen 151 together with a message asking the user whether to activate the projector module function. While the user touches the virtual slide bar 700, if the user inputs a drag in a right direction, the projector module 155 can be activated. Accordingly, an image (e.g., an initial image), which is designated as a default, can be projected via the lens 500 of the projector module 155. For example of the image designated as default, an image identical to the image currently displayed on the touchscreen 151 can be projected. The default-designated image is changeable via a prescribed men manipulation performed by the user. And, a changed item can be stored in the memory 160.

According to the above described embodiment, if the slide type cover is opened, the activation message asking the user whether to activate the projector module is displayed. Alternatively, if the slide type cover is open, a projector menu icon is displayed on a basic standby picture. If the displayed icon is selected, the activation message can be displayed. Alternatively, it is able to set the projector menu icon to be displayed in addition as soon as the combination of the mobile terminal and the projector module is completed. Alternatively, it is able to set the activation message to be displayed as soon as the combination of the mobile terminal and the projector module is completed. Besides, a touch action, which is inputted to the activation message picture by a user to activate the projector module, can be diversely changed.

Switching of Projection Direction

Once the projector module is activated by the above method described with reference to FIG. 7A and FIG. 7B, it is able to initiate the projection of an initial image. In this case, in case that a landscape-to-portrait ratio of an image provided by the projector module is asymmetric, a projection direction in landscape or portrait direction needs to be specified and/or changed. This initial projection direction is set in advance according to an image type or a projector relevant menu setting or can be changed by real time by a menu manipulation performed by a user.

In the following description, a method of setting/changing a projection direction of a projector module in a mobile terminal according to the present invention is explained.

First of all, a method of setting a projection direction through a menu setting is explained with reference to FIG. 8 as follows.

Figure 8:
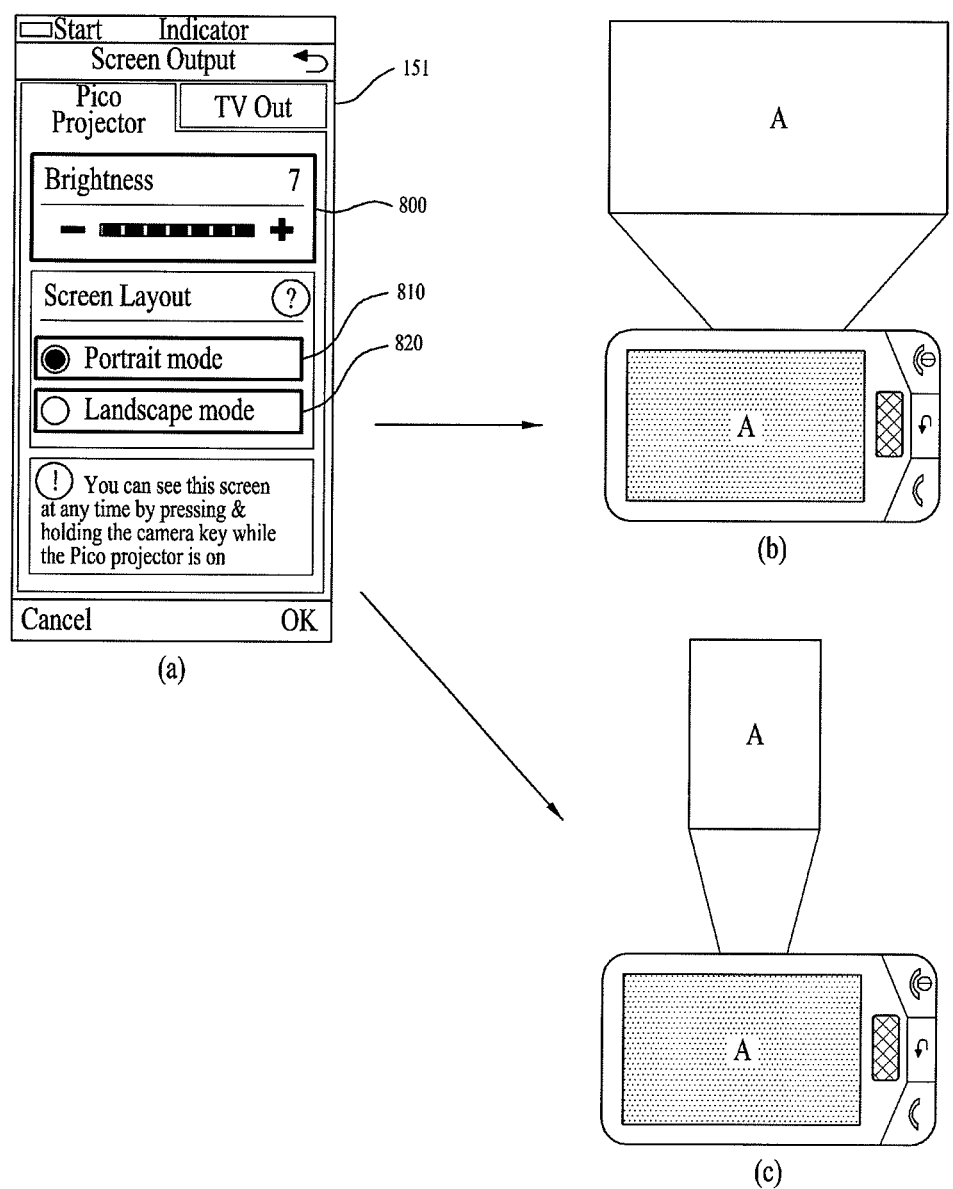
FIG. 8 is a diagram of one example for a method of setting a projection direction of a projector module in a mobile terminal according to one embodiment of the present invention.

FIG. 8 is a diagram of one example for a method of setting a projection direction of a projector module in a mobile terminal according to one embodiment of the present invention.

Referring to FIG. 8, a user performs a prescribed menu manipulation to enter a projector module relevant menu. Before a user activates a projector module, an initial projection direction can be ser via this menu. If a projector module is already activated, a current projection direction can be changed. For example of a projector module relevant menu picture, a menu picture, as shown in FIG. 8 (*a*), can be displayed on the display unit 151.

The projector module relevant menu can include an item 800 for adjusting brightness of a projection image, a landscape projection direction selecting item 810, a portrait projection direction selecting item 820 and the like.

If a user selects the landscape projection direction selecting item 810, the projection direction of the projector module, as shown in FIG. 8 (*b*), becomes a landscape. If a user selects the portrait projection direction selecting item 820, the projection direction of the projector module, as shown in FIG. 8 (*c*), becomes a portrait.

In the following description, a method of setting a projection direction using a hardware key is explained.

1) In case that a hardware key button mapped to a landscape projection function and a hardware key button mapped to a portrait are provided, a user presses the corresponding key button to set a projection direction.

2) It is able to set a projection direction using a single hardware key button. In this case, if a projection direction toggling function is mapped to a single hardware key, a current projection direction can be changed each time the corresponding key is manipulated by a user. For example, in case that a projection direction of a currently projected image is a landscape, if a user manipulates a toggling function mapped button, the projection direction is changed into a landscape. Such an operation can be repeated each time the corresponding key button is manipulated.

In case that a mobile terminal according to the present invention has the configuration shown in FIG. 5 or FIG. 6, it is highly probable that a camera is set to face a bottom in the course of projector module projection. Since a camera function is correspondingly deactivated, a camera relevant key button may not be used. Therefore, the toggling function mapped button preferably includes the camera relevant key button.

In the following description, a method off changing a direction using a hardware keypad of a slide type is explained.

Figure 9:
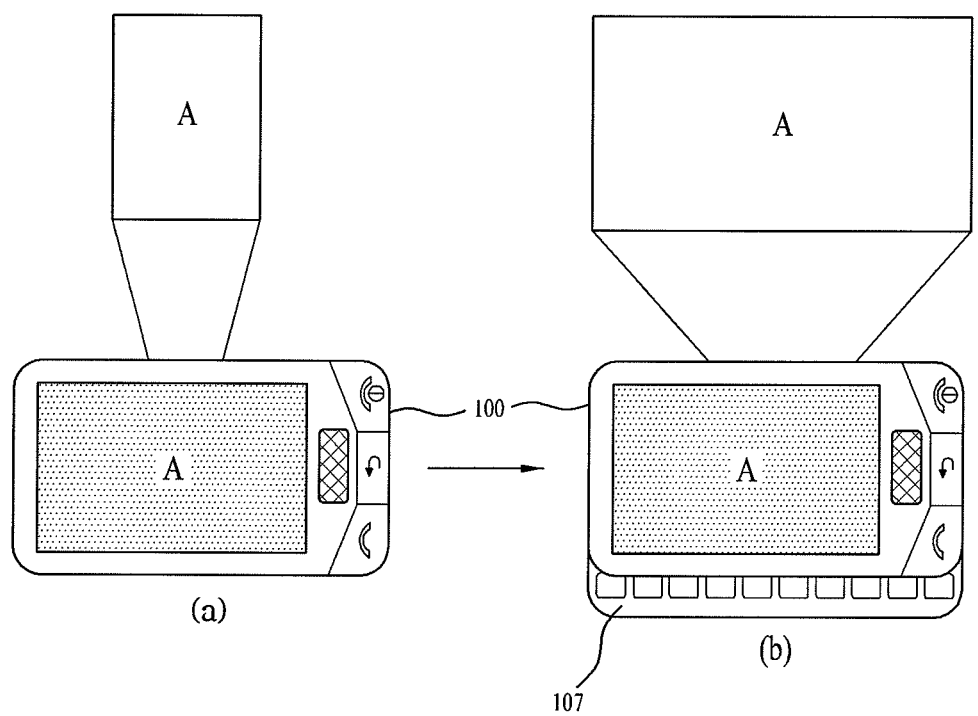
FIG. 9 is a diagram of another example for a method of setting a projection direction of a projector module in a mobile terminal according to one embodiment of the present invention.

FIG. 9 is a diagram of another example for a method of setting a projection direction of a projector module in a mobile terminal according to one embodiment of the present invention.

Referring to FIG. 9, it is assumed that a body of the mobile terminal 100 has a slide structure to enable opening and shutting. In this case, the slide type mobile terminal includes an upper body including a main display unit and a lower body including a backside and is configured to enable the upper body to slide in a prescribed direction within a range for enabling the upper body to avoid being separated from the lower body. As the upper body slides, a top surface of the lower body opposing a bottom surface of the upper body is exposed. In this case, a hardware key button of a prescribe type can be provided to the top surface of the lower body. In this disclosure, a type configured to enable the upper and lower bodied to be overlapped with each other is named 'normal state' or 'closed position'. And, a type configured to enable one of the upper and lower bodies to be misaligned with the other at a predetermined ratio (e.g., over a half of a maximum slidable range) by being pushed (sliding) is named 'slide state' or 'open position'.

Referring to FIG. 9 (*a*), a projection direction of a projector module of a mobile terminal according to the present invention is set to a portrait and an image is being projected in portrait direction. Afterwards, if a user pushes upward an upper body of the mobile terminal i.e., if a slide state is entered), as shown in FIG. 9 (*b*), the projection direction of the projector module 155 can be changed into a landscape direction.

In case that an image was being projected in the landscape direction in the normal state, when a user changes the mobile terminal into the slide state, the projection direction is maintained. On the contrary, in a situation shown in FIG. 9, if a user enables the upper body to return to an original position in the normal state, the projection direction can be changed into the landscape direction again.

Power Saving Mode

If a command input for a mobile terminal is not made by a user within a predetermined duration or a specific period of time passes after termination of a specific function of an application, the mobile terminal is able to enter a power saving mode to save power. In the following description, an operation of a projector module 155 in association with a power saving mode is explained.

First of all, a power saving mode applicable to a mobile terminal can be set by two steps. According to a first step, if there is no command input from a user during a preset duration, a backlight of a display unit is turned off or dimmed. Afterwards, if a command input is not still made during a predetermined duration, a second step is entered to completely deactivate the display unit. In this case, a time for entering the first-step power saving mode from a normal operation is set equal to or different from that for entering the second-step power saving mode from the first-step power saving mode.

1) Normal Operation→Power Saving Mode

In case that a user's command input keeps failing to exist in a mobile terminal, the mobile terminal experiences a first step and a second step of a power saving mode in sequence. In doing so, the projector module 155 can be set to perform the same operation at the same timing point of the display unit 151. In particular, as soon as the display unit 151 operates by the first step of the power saving mode, light intensity (i.e., projection brightness) of the projector module 155 can be reduced at a prescribed rate. Afterwards, the projector module 155 can be deactivated as soon as the display unit operates by the second step of the power saving mode.

Alternatively, when the display unit 151 enters the first-step power saving mode, the light intensity of the projector module 155 can be set unchangeable. As soon as the display unit 151 operates by the second-step power saving mode, the projector module 155 can be set to be deactivated.

2) Power Saving Mode H→Normal Operation

After the mobile terminal has entered the second step of the power saving mode, if a user inputs a command (e.g., a touchscreen touch, a hardware key button input, a slide state change, etc.), the mobile terminal can wake up (i.e., the mobile terminal returns to the normal mode). In case of returning to the normal mode, the mobile terminal preferably avoids the first step of the power saving mode. In this case, a method of reactivating the projector module is explained with reference to FIG. 10 as follows.

Figure 10:
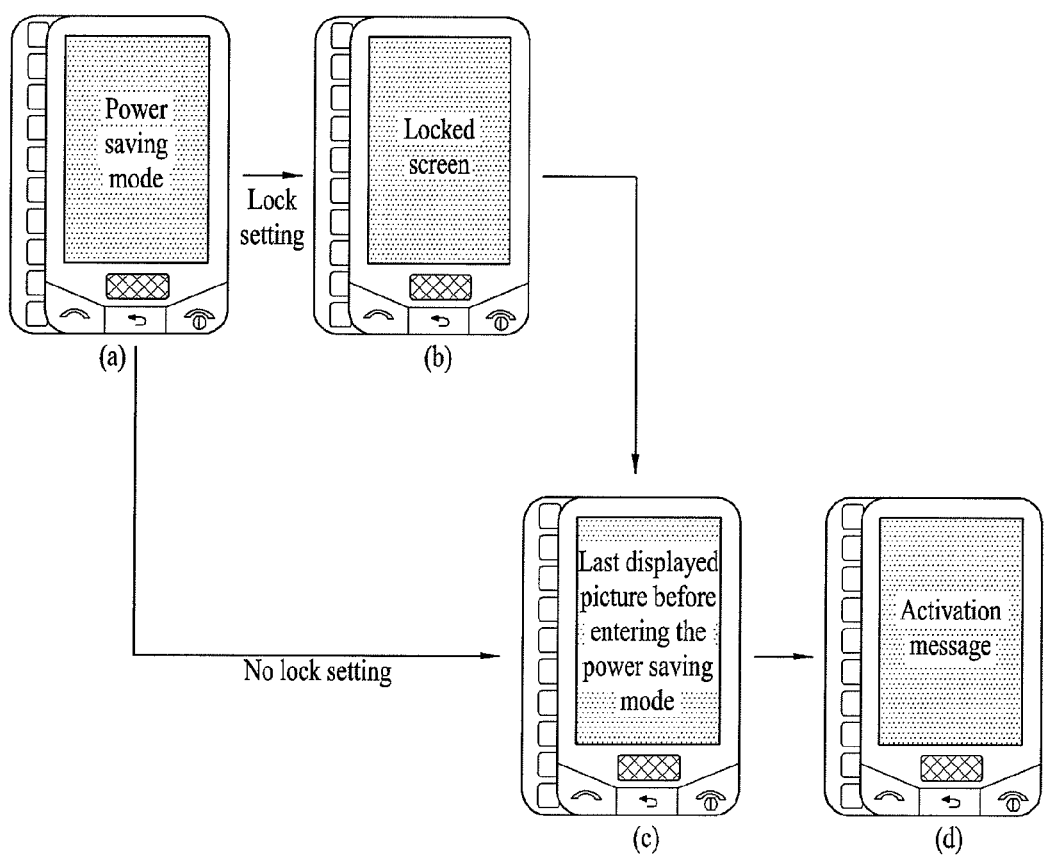
FIG. 10 is a diagram of one example for a method of reactivating a projector module when a mobile terminal according to one embodiment of the present invention wakes up from a power saving mode.

FIG. 10 is a diagram of one example for a method of reactivating a projector module when a mobile terminal according to one embodiment of the present invention wakes up from a power saving mode.

Referring to FIG. 10, if there is a user's command input or a manipulation of a user input unit in a power saving mode, a mobile terminal wakes up. When the mobile wakes up from the power saving mode, an auto lock function can be set to enter a locked state automatically. If the auto lock function is set, a lock function picture can be displayed, as shown in FIG. 10 (b), via a display unit. In this case, the locked state means a state that a normal operation is not available away from a prescribed lock function picture unless a user performs a specific manipulation (e.g., a specific touch input, a specific hardware key manipulation, a number input, etc.) in the course of displaying the prescribed lock function picture. If a user performs a specific manipulation to unlock the lock function in FIG. 10 (b) or the auto lock function is not set, a latest picture having been displayed prior to entering the power saving mode, as shown in FIG. 10 (c), can be displayed via the display unit 151.

The projector module 155 can be automatically activated as soon as the power saving mode ends (or the auto lock function is released if the auto lock function is set). Alternatively, if the activation message described with reference to FIG. 7B is displayed and a user then inputs a command for the projector module activation to the activation message, the projector module can be activated. In case of applying this activation message, when the slide type cover 510 of the projector module 155 is open, the activation message can be directly displayed. If the slide type cover 510 is closed, the activation message can be displayed when a user opens the slide type cover 510.

Heat Control Mode

Generally, a light source used for a projector module generates a considerable amount of heat if activated in long term, which shortens the durability of the light source. Moreover, the heat may have bad influence on a mobile terminal body connected to the projector module. To solve this problem, the present invention proposes a method of controlling heat generation by adjusting light intensity per operational time.

First of all, a light emitting diode (LED) is usable as a light source of a projector module according to the present invention. Generally, the LED has the following properties. Firstly, once the LED starts to operate at specific brightness, a temperature of the LED gradually increases for predetermined duration. Secondly, if the temperature of the LED reaches a peak temperature, it stops increasing. In doing so, the temperature of the LED increases up to the peak in proportion to the brightness. Using these properties, the LED is set to operate at maximum brightness until reaching a target temperature set by a user. Once the LED reaches the user-set target temperature, it can be set to operate at the brightness enabling a peak temperature to be set to the corresponding target temperature.

For instance, brightness levels are set to 1 to 7, respectively. If the brightness is 7, assume that a peak temperature is 60 degrees. If the rightness level is decremented from 7 by 1, assume that the peak temperature descends by 5 degrees. In case that a user's target temperature is 50 degrees, the LED is operated at the brightness level 7 until the temperature of 50 degrees is reached. When the LED temperature reaches 50 degrees, if the brightness level is adjusted into 5, it is able to maintain the LED temperature as 50 degrees.

For this, a thermometer can be separately provided to the projector. Preferably, a target temperature setting application according to a preset temperature property of a light source is provided. More preferably, the target temperature can be displayed in a manner of being converted by time unit in the application.

Incoming Call Reception in the Course of Image Projection

After a projector module has been activated, if an incoming call is received in the course of projecting a prescribed image from the activated projector module (e.g., if there is an incoming call), a mobile terminal according to the present invention operates as follows.

1) Display Screen

When the same image displayed on a display unit is projected from a projector module, an image including call relevant information (e.g., caller information, calling time information, etc.), which is displayed in case of performing an audio or video call, can be simultaneously displayed on both of the display unit and the projector module.

Alternatively, an image, which has been displayed until an incoming call, keeps being displayed via the projector module and call relevant information can be displayed on at least one prescribed region of the display unit. In this case, the call relevant information is displayed via a popup window or can be displayed on a whole screen or two sub-screens generated from dividing the whole screen in a manner of displaying a previous image on one of the two sub-screens and the call relevant information on the other.

2) Call Performed by User

If a user brings a mobile terminal (particularly, a portion of the mobile terminal provided with a speaker and/or microphone) to an ear to use a call function, it is preferable that a function of a projector module is deactivated. In order to automatically deactivate the projector module when a user makes a call, the present embodiment proposes a step of determining whether a user makes a call using the proximity sensor 141 described with reference to FIG. 4. For this step, the proximity sensor is preferably provided to a location adjacent to the speaker 152 configured to approach an ear of the user in the course of performing the call function.

For instance, after there has been an incoming call, a user grants a corresponding call connection and then brings the speaker 152 close to user's ear. In doing so, if the proximity sensor 141, which is provided adjacent to the speaker 152, detects the proximity within a preset distance (e.g., if user's face approaches the proximity sensor 141), the controller 180 disables a touch recognizing function of the touchscreen and is then able to deactivate an operation of the projector module. Therefore, according to the present method, in case that a user uses a speaker phone mode, the projector module keeps maintaining the activated or disabled state.

On the contrary, after the call has been ended, if the proximity sensor 141 fails to detect the proximity within the preset distance, the controller 180 immediately reactivates the function of the projector module or is able to control the aforesaid activation message to be displayed on the display unit 151.

Deactivation of Projector Module

A method of disabling a projector module is explained as follows.

1) Menu Manipulation

While a projector module is activated, if a user inputs a command for deactivating the projector module via a prescribed menu manipulation, the projector module can be deactivated.

2) Shutdown of Slide Type Cover

In case that a user closes a slide type cover provided to a projector module, it is able to deactivate the projector module. This is described with reference to FIG. 11 as follows.

Figure 11:
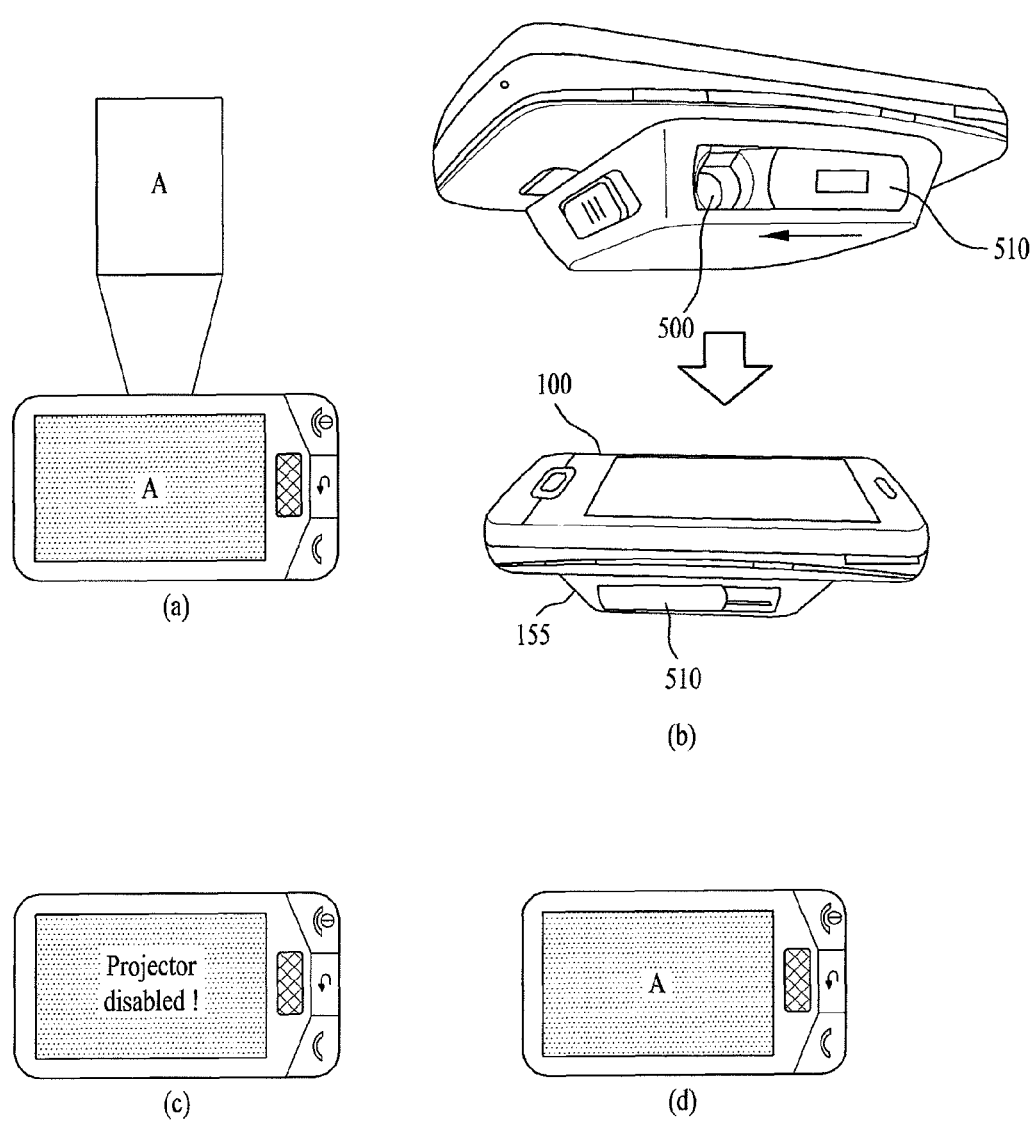
FIG. 11 is a diagram of one example for a method of deactivating a projector module in a mobile terminal according to the present invention.

FIG. 11 is a diagram of one example for a method of deactivating a projector module in a mobile terminal according to the present invention.

Referring to FIG. 11 (a), an image identical to a content displayed on a display unit is being projected from a projector module. If a user closes a slide type cover 510 to cover a lens 500, as shown in FIG. 11 (b), it is able to deactivate the projector module while a message indicating that the projector module is disabled, as shown in FIG. 11 (c), is displayed via the display unit. After prescribed duration, the message indicating that the projector module is disabled disappears as shown in FIG. 11 (d) and the last displayed image can be displayed again via the display unit 151. Optionally, it is able to skip the process shown in FIG. 11 (c).

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a housing having a first surface and a second surface;
a touchscreen provided at the first surface of the housing, the touchscreen being configured to recognize a touch input of a user;
a detachable projector module having an activation switch provided at a lateral side thereof, the projector module being configured to project a prescribed image on an external surface; and
a controller configured to display an activation message for receiving an activation confirmation of the projector module from the user on the touchscreen when the activation switch is manipulated,
wherein the detachable projector module is detachably connected to a second surface of the housing, and
wherein, when a specific event occurs in the course of projecting the prescribed image via the detachable projector module, the controller controls event relevant information to be displayed on at least one prescribed region of the touchscreen while the prescribed image keeps being displayed via the projector module.

2. The mobile terminal of claim 1, wherein the activation message includes a touch input zone for receiving a specific touch input, and
wherein, when the specific touch input is detected on the touch input zone, the controller activates the projector module.

3. The mobile terminal of claim 2, wherein the activation switch comprises a slide type lens cover, and
wherein, when the slide type lens cover is moved in a first direction, the controller activates the projector module.

4. The mobile terminal of claim 3, wherein, when the slide type lens cover is moved in a second direction opposite to the first direction, the controller deactivates the projector module.

5. The mobile terminal of claim 4, wherein, when the slide type lens cover is moved in the second direction, the controller displays for a prescribed duration a message indicating that the projector module is deactivated on the touchscreen.

6. The mobile terminal of claim 2, further comprising a proximity sensor configured to detect a distance the mobile terminal is spaced apart from the user,
wherein, during a state that an incoming call is connected, if the detected distance is equal to or smaller than a prescribed value, the controller deactivates the projector module.

7. The mobile terminal of claim 6, wherein, when the call is ended, and when the detected distance is greater than the prescribed value, the controller displays the activation message on the touchscreen.

8. The mobile terminal of claim 2, wherein the projector module is configured to change a projection direction of the prescribed image projected in a landscape or portrait direction under control of the controller.

9. The mobile terminal of claim 8, further comprising a hardware key button,
wherein the controller changes the projection direction each time the hardware key button is manipulated.

10. The mobile terminal of claim 9, further comprising a camera,
wherein the controller deactivates the camera when the projector module is activated, and
wherein the hardware key button includes a camera button configured to manipulate the camera.

11. The mobile terminal of claim 8, wherein the housing includes:
an upper housing having the touchscreen; and
a lower housing slidably connected to the upper housing, the projector module being detachably connected to the lower housing,
wherein the upper housing and the lower housing are slidable between a closed position and an open position, and
wherein the controller changes the projection direction according to whether the upper housing and the lower housing are in the open position.

12. The mobile terminal of claim 2, wherein, when a temperature of the projector module reaches a preset temperature, the controller adjusts the brightness of the projector module to maintain a specific value.

13. The mobile terminal of claim 2, wherein, when the touchscreen is activated in a power saving mode, the controller deactivates the projector module as soon as the touchscreen is deactivated.

14. The mobile terminal of claim 13, wherein, when the power saving mode is ended, the controller displays the activation message on the touchscreen.

15. The mobile terminal of claim 1, wherein the projector module is configured to be attached to the housing to provide a rear cover for the housing.

16. The mobile terminal of claim 1, further comprising a wireless communication module configured to transceive a call signal,
wherein the specific event comprises a reception of the call signal, and the event relevant information comprises call relevant information.

* * * * *